United States Patent [19]
Mastine et al.

[11] Patent Number: 5,209,703
[45] Date of Patent: May 11, 1993

[54] DRIVE PULLEY

[75] Inventors: Brian H. Mastine, Richmond; Gaetan Lecours, Valcourt; Duceppe Daniel, Sherbrooke, all of Canada

[73] Assignee: Bombardier Inc., Canada

[21] Appl. No.: 690,362

[22] Filed: Apr. 24, 1991

[30] Foreign Application Priority Data

Jun. 29, 1990 [CA] Canada ................................ 2020262

[51] Int. Cl.⁵ .............................................. F16H 61/00
[52] U.S. Cl. ......................................... 474/14; 474/70
[58] Field of Search .............................. 474/13, 14, 70

[56] References Cited

U.S. PATENT DOCUMENTS

| | | |
|---|---|---|
| 3,230,787 | 1/1966 | Siegal . |
| 3,597,987 | 8/1971 | Kiekhaefer . |
| 3,727,478 | 4/1973 | Erickson et al. . |
| 3,759,111 | 9/1973 | Hoff . |
| 3,777,583 | 12/1973 | Talbot ............................ 474/14 |
| 3,861,229 | 1/1975 | Domaas ........................... 474/14 |
| 3,971,263 | 7/1976 | Beaudoin et al. . |
| 3,986,406 | 10/1976 | Prasad . |
| 4,027,544 | 6/1977 | Kobayasi ......................... 474/14 |
| 4,052,908 | 10/1977 | Takagi et al. . |
| 4,284,408 | 8/1981 | Boer et al. ....................... 474/14 |
| 4,483,686 | 11/1981 | Kobayasi et al. ............. 474/14 X |
| 4,575,363 | 3/1986 | Burgess et al. ................... 474/14 |
| 4,826,467 | 5/1989 | Reese et al. ..................... 474/14 |

FOREIGN PATENT DOCUMENTS 985931  3/1976  Canada .
1208040 7/1986  Canada .

Primary Examiner—Terry Lee Melius
Assistant Examiner—Roger J. Schoeppel
Attorney, Agent, or Firm—Larson and Taylor

[57] ABSTRACT

A variable ratio drive pulley designed for use in a belt drive transmission of a snowmobile includes fixed and movable flanges, the movable flange being controlled by centrifugally responsive thrust means employing pivoted weighted levers cooperating with shaped cam surfaces. The dynamic response of the pulley can be adjusted in a simple manner by abutment means supporting the ramps on which the cam surfaces are provided, these abutment means being accessible for adjustment from the exterior of the pulley.

15 Claims, 7 Drawing Sheets

DRIVE PULLEY

BACKGROUND OF THE INVENTION a) Field of the Invention

This invention relates to a new or improved variable ratio drive pulley. Such drive pulleys are widely used in belt drive transmissions for vehicles such as snowmobiles to provide both a clutch and a speed responsive variable drive ratio.

b) Description of the Prior Art

As used in snowmobiles, such drive pulleys are attached to the output shaft of the engine and comprise a fixed flange and a movable flange between which is engaged a transmission drive belt, the pulley containing weighted levers or the like which are influenced by the rotational speed of the pulley to displace the movable flange towards the fixed flange as the speed of rotation increases so that the radius at which the transmission belt is engaged between the flanges increases. Examples of such variable diameter drive pulleys can be seen in our Canadian Patents 985,931 and 1,208,040.

SUMMARY OF THE INVENTION

The present invention provides a variable ratio drive pulley comprising:

two opposed frusto-conical flanges arranged coaxially with respect to a drive shaft to rotate therewith and impart a variable ratio drive to a transmission belt arranged between the flanges;

one said flange comprising a fixed flange that is fixed axially relatively to said shaft, and the other said flange being a movable flange that is movable axially of said shaft so that the frusto-conical front face thereof moves towards and away from the confronting frusto-conical face of the fixed flange;

biasing means operatively arranged between said shaft and said movable flange to urge the latter axially away from said fixed flange;

centrifugally responsive thrust means operative upon rotation of said drive pulley to generate an axially directed thrust force acting to urge said movable flange towards said fixed flange, the magnitude of said thrust force increasing with the speed of rotation of said drive pulley;

said thrust means comprising a plurality of weighted levers equiangularly spaced about the axis of said shaft, and a corresponding plurality of cooperating ramps, each lever being pivotally mounted at one end in the movable flange and having its opposite end positioned to cooperate with a respective ramp that is carried in a part that is fixed with respect to said drive shaft, and adjustment means accessible from the exterior of said drive pulley and operative to alter the attitude of said ramps and thus the dynamic response of said thrust means.

The ramps are preferably mounted in a carrier formed by a cup that is fixed to rotate with the shaft, the ramps being arranged in generally radial planes confronting the weighted levers that are pivotally mounted near the periphery of the movable flange. The cup has radial arms that cooperate with axially extending guide walls on the rear of the movable flange to constrain the movable flange to rotate with the shaft. Preferably the adjustment means is in the form of two diametrically opposed eccentric members carried in the cup to provide an adjustable abutment to support the rear of each ramp, adjustment of the abutment by angular adjustment of the eccentric members changing the attitudes of the associated ramps and thus the dynamic response of the drive pulley.

BRIEF DESCRIPTION OF THE DRAWINGS

The invention will further be described, by way of example only, with reference to the accompanying drawings wherein.

DESCRIPTION OF THE PREFERRED EMBODIMENT

Figure 1:
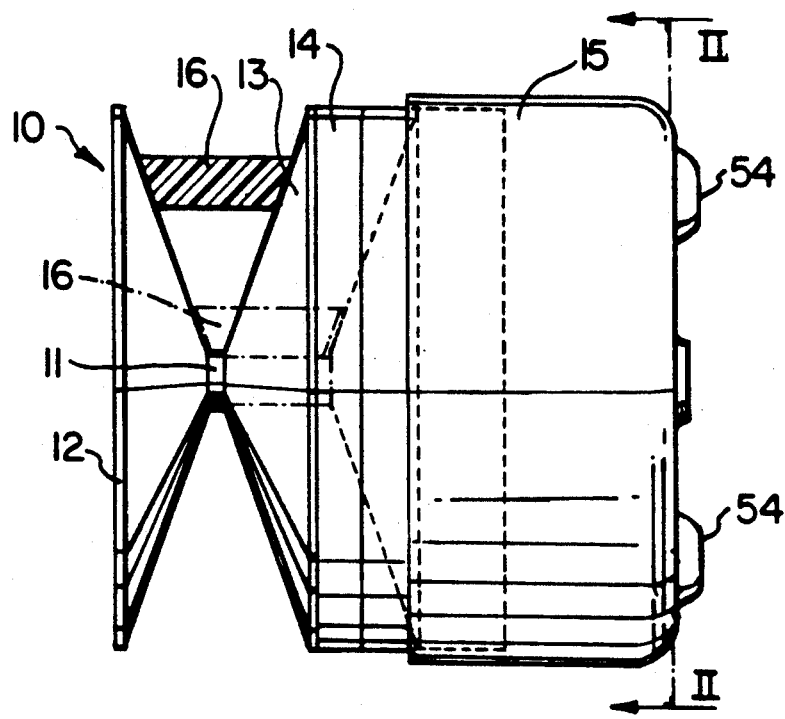
FIG. 1 is a side elevation of one embodiment of the variable ratio drive pulley in accordance with the invention.
Figure 3:
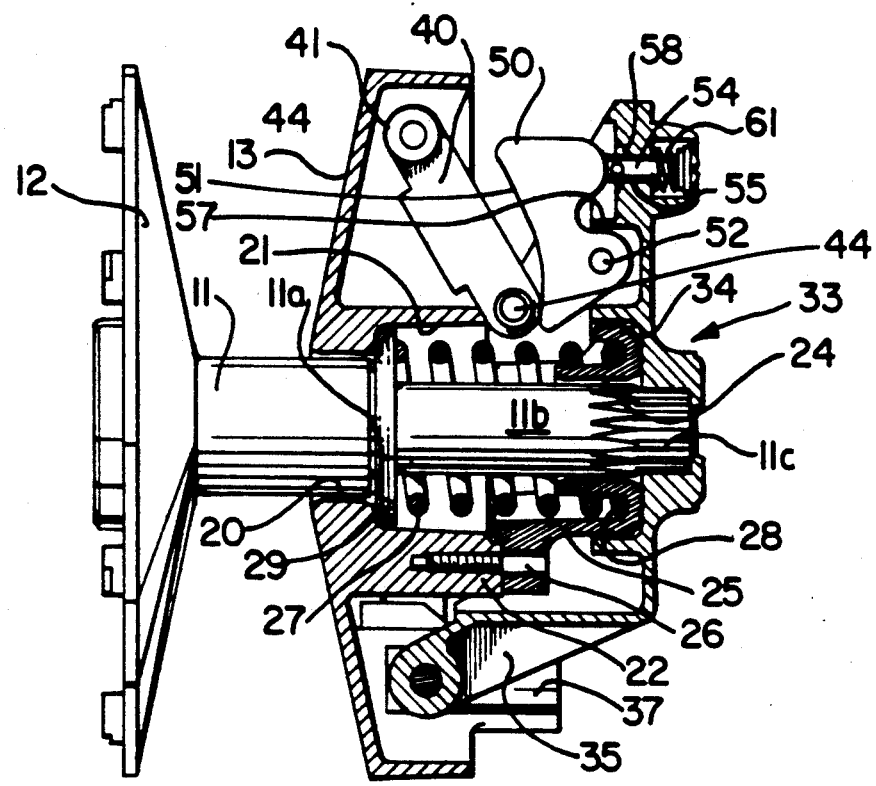
FIG. 3 is a sectional view taken on the line III—III in FIG. 2.

As seen in FIG. 1, a drive pulley for a snowmobile belt transmission is indicated generally by the numeral 10 and comprises a shaft 11 with a fixed flange 12 of frusto-conical shape and an opposed frusto-conical movable flange 13. The fixed flange 12 is axially and rotationally secured to the shaft whereas the movable flange 13 is displaceable in the axial direction towards and away from the fixed flange, although the movable flange is also constrained to rotate with the shaft 11. On its rear side the movable flange 13 has a short cylindrical peripheral wall 14 which is sized to be slid axially within a cylindrical cover 15. Upon displacement of the movable flange axially between the positions shown in full lines and in broken lines in FIG. 1. As best seen in FIG. 3, the shaft 11 passes through a bore 20 in the movable flange 13, this bore being expanded into an enlarged counterbore 21 defined by an annular wall structure 22 formed integrally in the movable flange 13. The bore 20 forms a close sliding fit with the shaft 11. As seen in FIG. 3, the shaft 11 defines a stepped shoulder 11a leading to a reduced diameter shaft section 11b having a splined end section 11c. The reduced diameter shaft section passes through an axial bore 24 of a cylindrical cap 25 that is attached to the wall 22 by threaded fasteners 26. The cap 25 and the wall 22 together define a generally annular chamber that surrounds the shaft section 11b and within which is positioned a coiled compression spring 27 one end of which presses against the grooved end 28 of the cap, and the other end of which presses against an annular seating element 29 positioned against the shoulder 11a.

Figure 2:
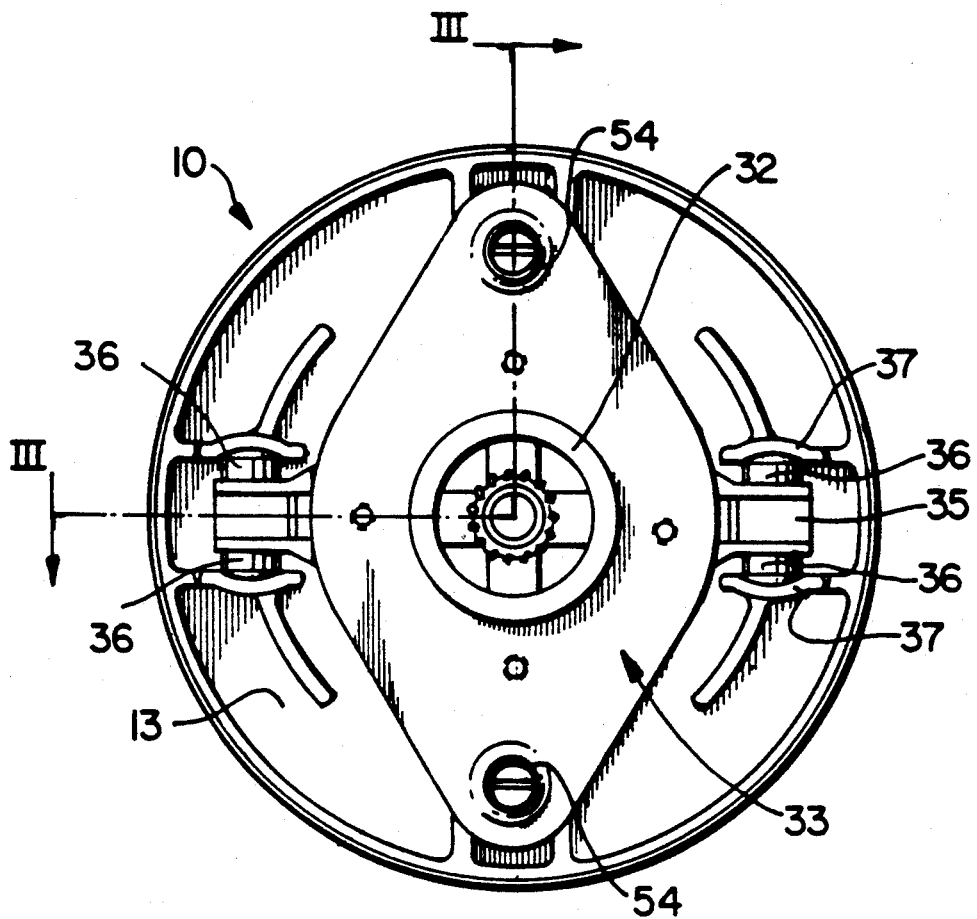
FIG. 2 is a view in the direction of the arrows II—II in FIG. 1 and to a larger scale showing the drive pulley with the cover removed.
Figure 4:
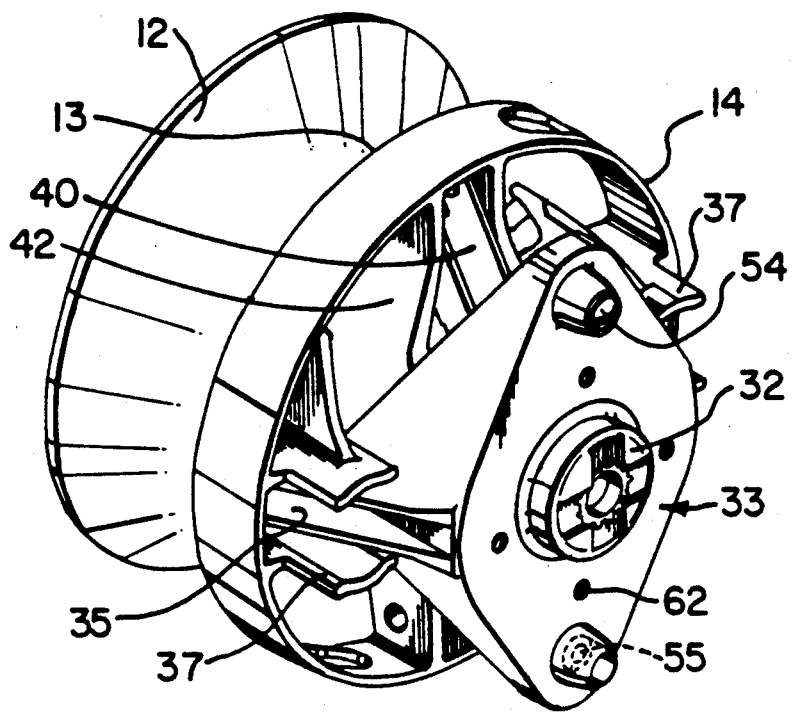
FIG. 4 is a perspective view corresponding to FIG. 2.

As seen in FIGS. 2, 3 and 4, a governor cup assembly 33 is carried on the splined end 11c of the shaft and is fixed against axial and rotary movement with respect to the shaft.

As will be understood from the foregoing, the force of the compression spring 27 acts to press the seat element 29 against the shoulder 11a, and to press the cap 25 and movable flange 13 to the right as seen in FIG. 3, displacement of this assembly being limited by the cap end 28 coming into abutment with an annular seat 34 in the governor cup assembly 33.

Figure 6:
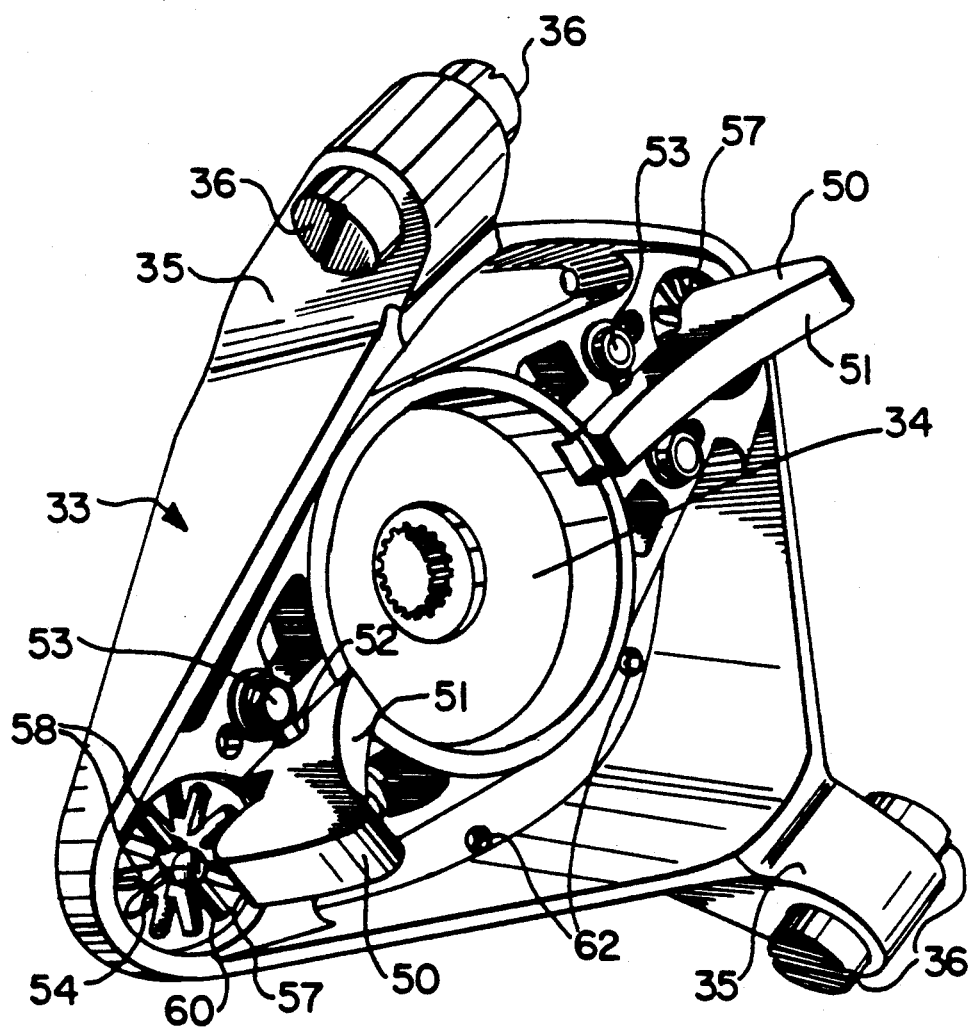
FIG. 6 is a perspective view of the governor cup taken from the side opposite that shown in FIG. 4.

The governor cup assembly 33 includes a pair of diametrically opposed drive arms 35 adapted to transmit rotary movement of the shaft to the movable flange 13 while still permitting axial movement therebetween. As seen in FIGS. 4 and 6, each arm 35 is in the form of a lug that projects radially outwardly and forwardly towards the rear side of the movable flange 13, and carries on its end a pair of oppositely directed slider elements 36 (which may be spring-loaded or fixed), these being of generally cylindrical form and having convexly curved outer ends. The end of each drive arm 35 is received between a pair of axially extending concavely curved walls 37 formed integrally with the movable flange 13 and projecting to the rear therefrom. Where the elements are spring-loaded the spacing between the walls 37 of each pair is slightly less than the spacing between the convex surfaces of the opposed slide elements 36, so that these must be compressed inwardly to be received between the walls 37. The elements 36 are made of any suitable low-friction material such as nylon. Alternatively, the elements 36 could be mounted on rubber seats (not shown) in the arms 35, the characteristics of the rubber being chosen to provide the necessary degree of resilience and in addition to provide damping. The walls 37 are positioned as close to the outer periphery of the movable flange 13 as is feasible to maximize torque transmission between the governor cup assembly 33 and the movable flange 13.

Figure 5:
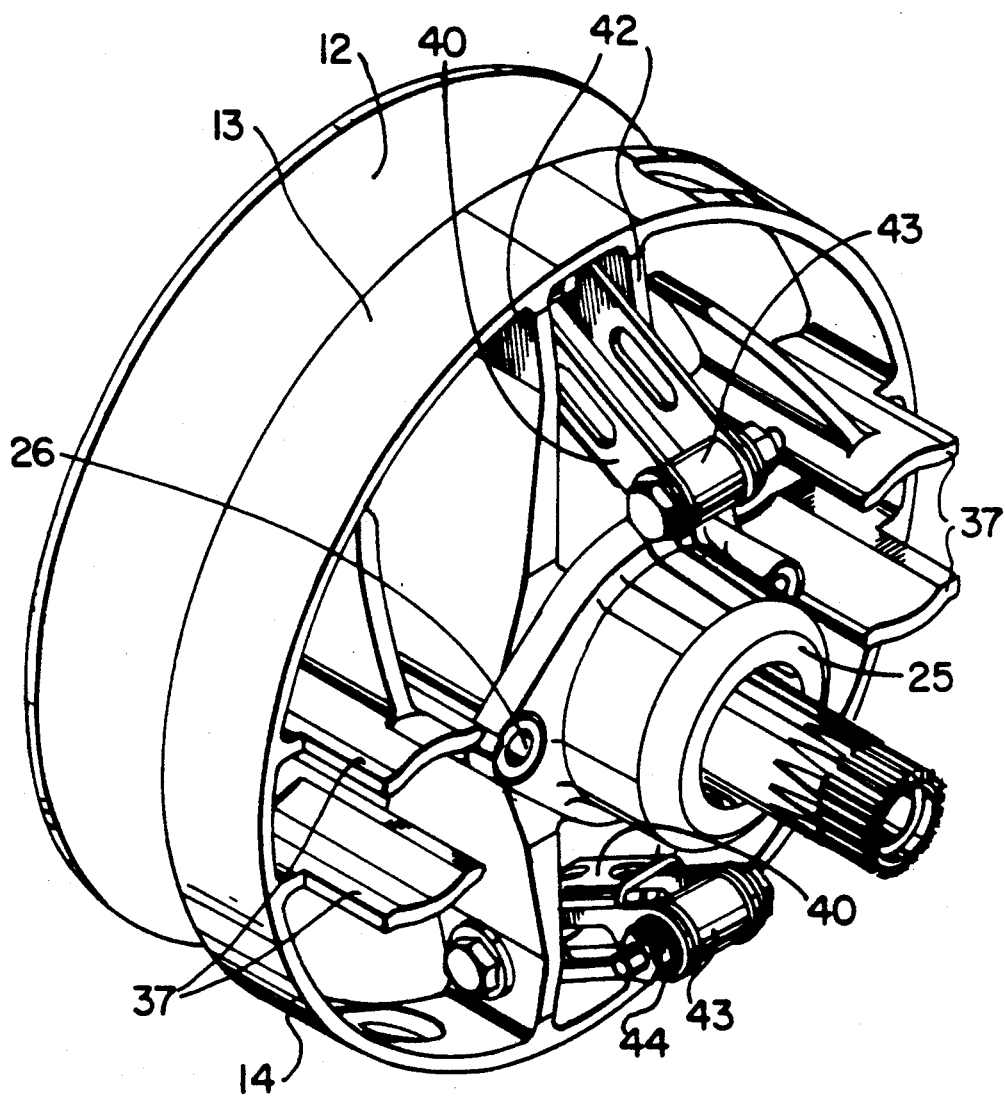
FIG. 5 is a perspective view corresponding to FIG. 4 but with the governor cup removed.

Centrifugal means are provided to effect displacement of the movable flange 13 from its fully retracted position as shown in FIG. 3 towards the left to the fully advanced position as shown in FIG. 1 against the force of the spring 27. These means comprise a pair of weighted levers 40 (see FIGS. 3 and 5) each of which is pivotally mounted on an axis 41 defined by a pivot pin carried in a pair of spaced walls 42 on the rear of the movable flange 13. Each lever 40 may be of any suitable construction, e.g. formed from pressed sheet metal or the like and extends generally inwardly away from the pivot axis 41 terminating in a low-friction roller 43 attached to the free end of the lever 40 by suitable fastener means 44. Weighting of the levers 40 may be achieved by any suitable means, and for example may be provided by the fastener means 44, together with washers or other selected masses.

Each weighted lever 40 is designed to cooperate with an adjustable ramp 50 that is carried in the governor cup assembly 33 and presented towards the associated lever 40. As best seen in FIGS. 3 and 6, the ramps 50 are in the form of flat steel plates having a convexly curved cam surface 51, and each being carried on a transverse pin 52 that is secured in recesses in the cup assembly 33 by fasteners 53 so that the ramp 50 is arranged in a radial plane with respect to the axis of the shaft 11 and can pivot to a limited extent about its pin 52. The location of the pin 52 will in practice be considerably closer to the axis of the shaft 11 than is illustrated in FIGS. 3 and 6, and of course can be varied as required in accordance with the overall design. The radially outer portion of the ramp 50 is supported by an abutment formed by the end of a stem 54 that is supported in the governor cup 33 behind the outer part of the ramp 50, as seen in FIGS. 3, 4 and 6. Each stem 54 extends parallel to the axis of the shaft 11 and passes through a cylindrical bore 55 in the governor cup 33. On the front face of the governor cup assembly surrounding the bore 55 there is an annular recess 57 in which are provided a series of seats 58 extending radially from the bore 55, these seats being arranged in diametrically opposed pairs, and each pair of seats being at a different axial location with respect to the bore 55. A transverse rod 60 extends through the forward end of the stem 54 and is adapted to cooperate with one or other of the pairs of seats 58 depending upon the angular position of the stem 54. The rod 60 is urged into engagement with the seats 58 by means of a compression spring 61 enclosing the stem 54 between its head and the rear surface of the governor cup assembly. Thus, to reposition the rod 60, the head of the stem 54 is engaged by a suitable tool, such as a screwdriver, (not shown) and the stem is advanced to compress the spring 61 and free the rod 60 whereupon the stem 54 can be rotated to align the rod with a selected pair of seats which it then engages when the stem 54 is released. As shown in FIG. 6, there are six pairs of seats 58 at angularly spaced positions, but a greater or lesser number can be provided as desired.

The end wall of the cover 15 that fits over and is attached to the rear of the governor cup assembly 33 has a large central opening to surround the central boss 32 and also has diametrically opposed circular openings to register with the stems 54 and allow unimpeded access to them and to the bores 55 and bore extensions 56 so that the stems 54 can be inserted and adjusted without any disassembly whatever of the pulley, since not even the cover 15 need be removed. The cover is secured by any suitable means, e.g. by a series of small screws extended through the end wall thereof and engaged in a corresponding series of threaded through holes 62 in the end wall of the governor cup assembly 33.

It will be appreciated that repositioning the rod 60 from one pair of seats 58 to another has the effect of axially adjusting the position of the abutment formed by the end of the stem 54, which, as will be seen from FIG. 3, will effect angular adjustment of the ramp 50 about its pin 52.

In operation, when the drive pulley is stationary or rotating at a low speed, the parts occupy the position as shown in FIG. 3 and the transmission belt 16 (FIG. 1) is not engaged between the flanges 12 and 13 and therefore is not driven. The movable flange 13 is held in this position by the force of the spring 27. As the rotational speed of the drive pulley increases, the centrifugal force acting on the weighted levers 40 tends to pivot these outwardly (counter clockwise as seen in FIG. 3) and this force produces an interaction between the rollers 43 and the cam surfaces 51 which generates an axial thrust on the movable flange 13 urging it towards the fixed flange 11. As the centrifugal force increases, this axial thrust becomes sufficient to overcome the force of the spring 27 and displace the movable flange 13 progressively closer to the fixed flange 12 until ultimately the position shown in full lines in FIG. 1 is reached. During this displacement of the movable flange 13, the transmission belt 16 is first engaged between the flanges at a radius adjacent the shaft 11, but as the speed increases the transmission belt is gradually forced to contact the flanges at an increasing radius. Also the peripheral wall 14 of the movable flange 13 becomes progressively more extended from within the cover 15 until the position shown in full lines in FIG. 1 is reached. The wall 14 is therefore telescopically arranged with respect to the cover 15.

It will be appreciated that the centrifugally generated thrust force acting on the movable flange 13 is a function of the geometry of the parts, and in particular of the relationship between the levers 40 and the shaped cam surface 51 of the ramps 50. The dynamic response of the pulley can be altered by varying these relationships, and this is the effect that is achieved by the adjustment means described in connection with the stems 54. By altering the axial position of the abutment formed by the end of a stem 54, a corresponding variation is made in the orientation of the cam surface 51 of the associated ramp 50.

The drive pulley as described above is of relatively simple low cost construction, and yet is extremely flexible in terms of its capacity to vary the dynamic response through the use of simple adjustment means without any need for disassembly of the components. Furthermore, if a greater range of adjustment is required than can be achieved simply through the stems 54, the drive pulley can be disassembled, the ramps 50 and/or the weighted arms 40 and/or the spring 27 being modified or replaced to provide the desired characteristics.

Figure 7:
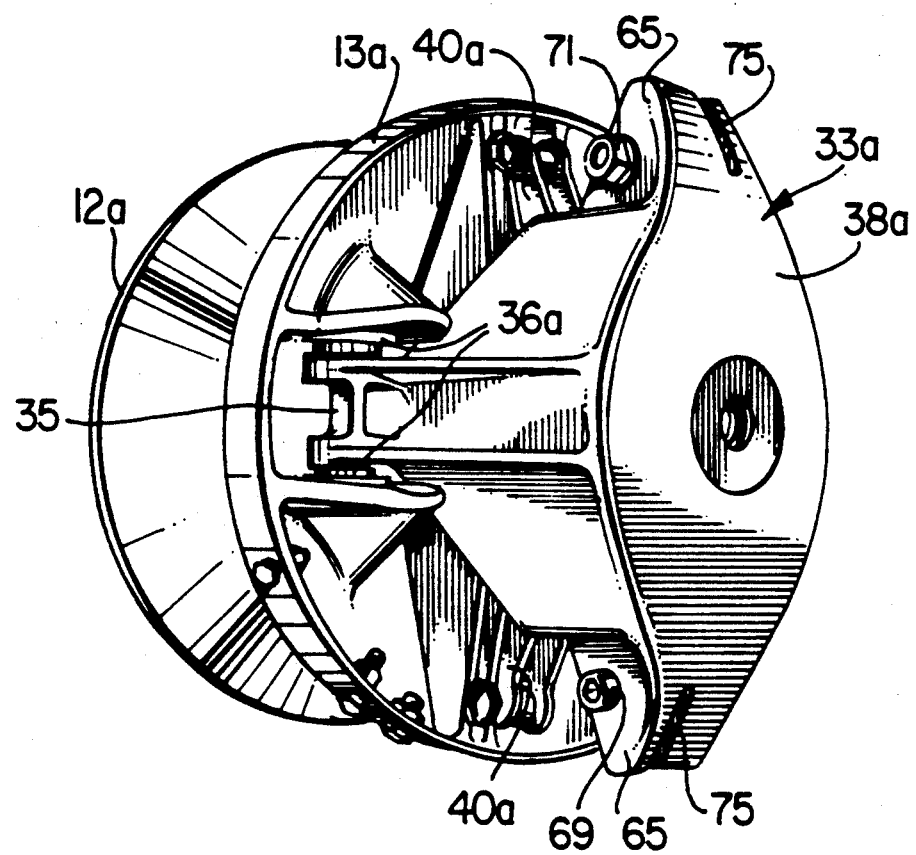
FIG. 7 is a perspective view of a preferred embodiment of the drive pulley in accordance with the present invention.

The embodiment shown in FIGS. 7 through 10 is basically similar to the one described above, but incorporates a number of refinements and improvements. Referring to FIG. 7, the drive pulley 10a comprises a fixed flange 12a and a movable flange 13a, but there is nothing equivalent to the cover 15 of FIG. 1, but rather the governor cup 33a is of more streamlined form having a smooth convexly curved end surface 38a. Apart from the absence of the cover 15, the embodiment of FIGS. 7 to 10 differs from the one earlier described chiefly in the arrangement and mounting of the slider elements 36a and the adjustment means for the ramps 50a.

Figure 8:
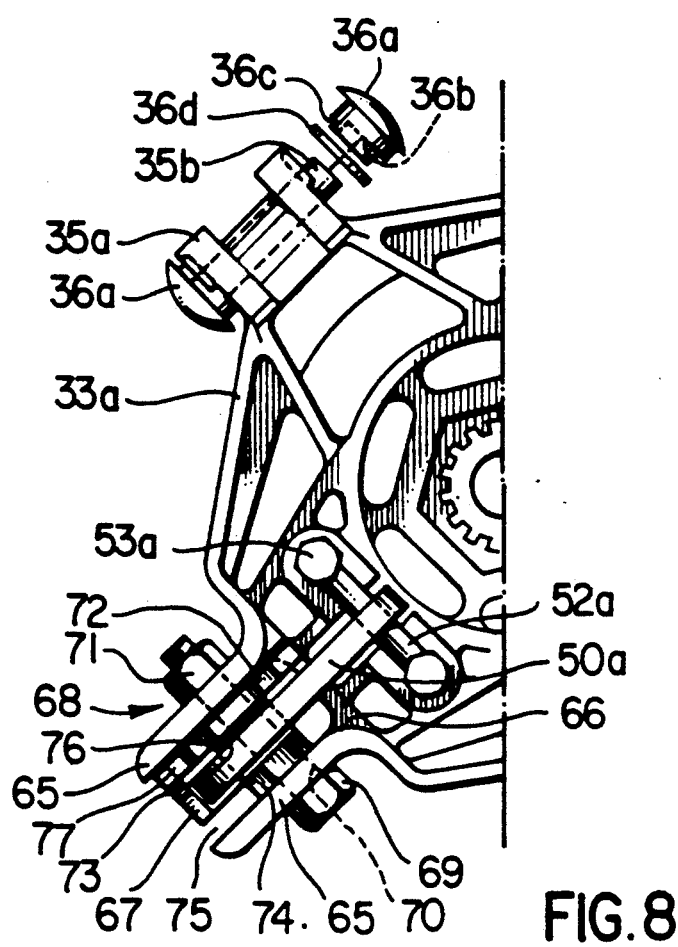
FIG. 8 is an axial view of a portion of the governor cup of the drive pulley of FIG. 7.

As best seen in FIG. 8, the drive arms 35a of the governor cup 33a each carries a pair of transversely projecting registering studs 35b. Each slider element 36a is a plastic moulding formed with a bore 36b adapted to receive the stud 35b, and having in its outer periphery a groove 36c to receive a rubber ring 36d, as shown in the exploded illustration in FIG. 8 at the upper side of the arm 35a. As shown in the lower side of the drive arm 35a, in the installed condition, the ring 36 is located between the side wall of the drive arm 35a and the end of the slider element 36a to provide a resilient mounting for the latter.

Figure 9:
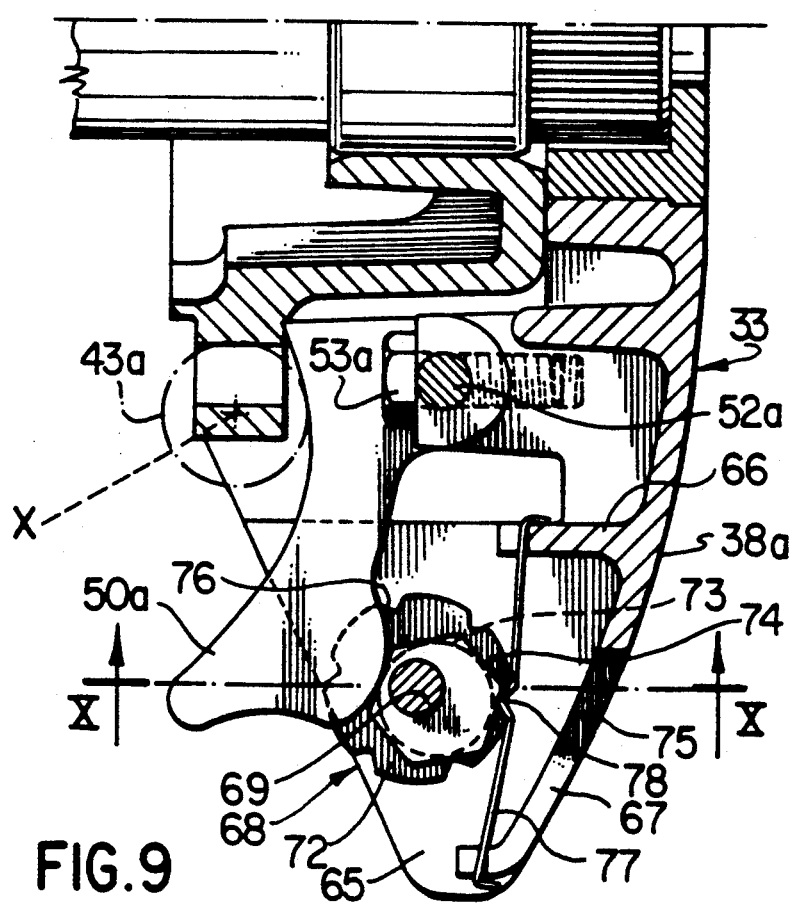
FIG. 9 is a sectional view taken on the line IX—IX in FIG. 8.

The weighted levers 40a are shown only schematically in FIG. 9 and are not substantially different to those of the embodiment of FIGS. 1 to 6. Their rollers 43a as before cooperate with ramps 50a each of which carries a pin 52a on which it is pivotally adjustable, the pin being secured to the governor cup 33a by means of fasteners 53a. Each ramp 50a is arranged generally radially of the axis of the governor cup 33a, and passes between integral spaced parallel walls 65 which are spanned by a web 66 at their radially inner ends, and are likewise joined at their bases by a further transverse wall 67.

Figure 10:
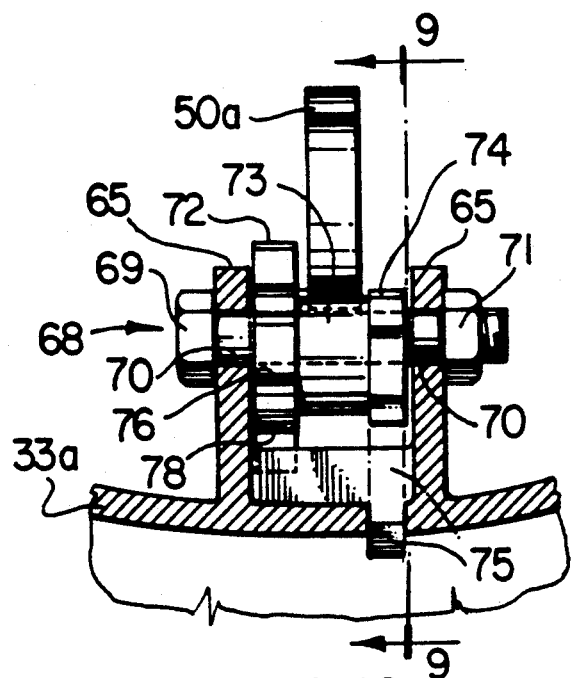
FIG. 10 is a sectional view taken on the line X—X of FIG. 9.

An adjustment mechanism 68 is mounted between the transverse walls 65 and comprises a threaded bolt 69 which passes through aligned bores 70 in the wall 65 and is clamped in position by a nut 71, the bolt passing through an adjustor element which is located between the walls 65. The adjustor element comprises a disc-shaped part 72 which is integral with an intermediate cylindrical eccentric 73 adjacent which is a coaxial hexagonal section 74. The eccentric 73 is aligned with and is engaged by the underside of the ramp 50a, as best seen in FIG. 10, whereas the hexagonal section 74 registers with an elongate slot 75 that opens from the outer end of the transverse wall 67. The disc section 72 has a series of sharp notches 76 spaced uniformly about its periphery, and is registered with a leaf spring 77 which as best seen in FIG. 9 has one end hooked over the web 66 and the opposite end hooked over the outer end of the transverse wall 67. There is a V-shaped bent section 78 in the middle of the leaf spring 77 positioned to engage in a registering one of the notches 76.

The functioning of the adjustment mechanism should be clear from the foregoing, and particularly with reference to FIG. 9. The ramp 50a rests upon the eccentric section 73 at a position determined by the angular orientation of the disc part 72, the latter being retained in the selected position by engagement of the bent section 78 of the leaf spring 77 in the corresponding one of the notches 76 as shown. To alter the position of adjustment, all that is necessary is to insert a tool such as a key through the slot 75 to engage the hexagonal section 74, and by means of such tool apply a rotational force that is sufficient to overcome the resistance of the leaf spring and rotate the disc successively past the other limiting positions as determined by the locations of the notches 76 until the desired position of adjustment is reached. It will be clear that adjustment of the eccentric 73 will have the effect of varying the ramp 50a, and thus varying the dynamic characteristics of the drive pulley.

The adjustment system described is very simple to operate and requires no disassembly of the drive pulley. If desired the disc 72 can bear numbers or other indicia adjacent the notches 76 to give a visual indication as to the position of adjustment of the associated eccentric part 73, since it is most desirable that adjustment of the two ramps 50a should be identical.

What we claim as our invention is:

1. A variable ratio drive pulley comprising:
    two opposed frusto-conical flanges arranged coaxially with respect to a drive shaft to rotate therewith and impart a variable ratio drive to a transmission belt arranged between the flanges;
    one said flange comprising a fixed flange that is fixed axially relatively to said shaft, and the other said flange being a movable flange that is movable axially of said shaft so that the frusto-conical front face thereof moves towards and away from the confronting frusto-conical face of the fixed flange;
    biasing means operatively arranged between said shaft and said movable flange to urge the latter axially away from said fixed flange;
    centrifugally responsive thrust means operative upon rotation of said drive pulley to generate an axially directed thrust force acting to urge said movable flange towards said fixed flange, the magnitude of said thrust force increasing with the speed of rotation of said drive pulley;
    said thrust means comprising a plurality of weighted levers equiangularly spaced about the axis of said shaft, and a corresponding plurality of cooperating ramps, each lever being pivotally mounted at one end in the movable flange and having its opposite end positioned to cooperate with a respective range that is carried in a part that is fixed with respect to said drive shaft, and adjustment means accessible from the exterior of said drive pulley and operative to alter the attitude of said ramps and thus the dynamic response of said thrust means, wherein each said ramp is supported at one point in its length upon an abutment mounted in said carrier, and at a second point spaced from said first point is carried upon a pivot mounting, said abutment being configured for engagement by a tool to be adjustable to alter the attitude of said ramp by moving it angularly about said pivot mounting, said adjustment being possible while said drive pulley remains fully assembled.

2. A variable ratio drive pulley according to claim 1 wherein said ramps are mounted in a carrier that is fixed to rotate with said shaft, said ramps being held in said carrier in generally radial planes and confronting the rear side of said movable flange wherein said levers are pivotally mounted.

3. A variable ratio drive pulley according to claim 2 including guide means acting between said carrier and said movable flange to constrain the latter to rotate with said shaft while accommodating relative axial movement therebetween.

4. A variable ratio drive pulley according to claim 3 wherein said guide means comprises a plurality of radial arms on said carrier equiangularly spaced about the axis of said shaft, each arm having near the extremity thereof a pair of opposed low-friction slide elements; said movable flange having on the rear thereof and adjacent its periphery pairs of axially extending angularly spaced guide walls for engagement by said slide elements.

5. A variable ratio drive pulley according to claim 4 wherein said slide elements are carried on studs formed on opposite sides of said arms, and are supported in engagement with said guide surfaces by means of rubber seating members.

6. A variable ratio drive pulley according to claim 4 including two said weighted levers arranged in diametrically opposed positions and two said radial arms arranged in diametrically opposed positions, there being a 90 degree separation between the weighted levers and the radial arms.

7. A variable ratio drive pulley according to claim 1 wherein said abutment is provided on the side of said carrier that faces the rear of said movable flange and is provided by an eccentric member that is angularly adjustable about an axis transverse to the axis of said drive shaft.

8. A variable ratio drive pulley according to claim 7 wherein means are provided to retain said eccentric member in a selected position of adjustment.

9. A variable ratio drive pulley according to claim 8, wherein said retaining means comprises said eccentric member having associated therewith a first part that is configured for engagement by a tool whereby said eccentric member can be adjusted to a desired angular position about the axis thereof and a second part that is configured to be releasably engaged by a detect means in a number of angular orientations of said eccentric member about its axis to provide a corresponding number of positions of adjustment.

10. A variable ratio drive pulley according to claim 9 wherein said first and second parts are distinct and are positioned at opposite ends of said eccentric member forming an integral unit therewith, said unit being rotatably mounted on a pin that is carried in a wall member that is fixed with respect to said drive shaft.

11. A variable ratio drive pulley according to claim 10 wherein said pin comprises a bolt that is supported between a pair of spaced radial walls, said second part of said unit comprising a disc having a series of spaced peripheral notches, said detent means being in the form of a leaf spring engageable with said notches.

12. A variable ratio drive pulley according to claim 10 wherein said first part of said unit comprises a formation defining a plurality of pairs of opposed flat surfaces engageable by a key to effect rotation of said unit.

13. A variable ratio drive pulley according to claim 1 wherein said abutment is provided on the side of said carrier that faces the rear of said movable flange and is carried on a spring-loaded stem that is accessible from the opposite side of said carrier.

14. A variable ratio drive pulley according to claim 13 wherein said stem is rotatable in an axially directed hole in said carrier and is selectively engageable with any one of a plurality of angularly spaced seats adjacent said hole, said seats being at different axial locations so that the position of said abutment can be selectively altered by moving the stem from engagement with one seat to engagement with another.

15. A variable ratio drive pulley according to claim 14 wherein said stem is accessible from the exterior of said drive pulley and is adapted for adjustment by means of a simple tool such as a screwdriver.

* * * * *

UNITED STATES PATENT AND TRADEMARK OFFICE
CERTIFICATE OF CORRECTION

PATENT NO. : 5,209,703
DATED : May 11, 1993
INVENTOR(S) : MASTINE, et al

It is certified that error appears in the above—identified patent and that said Letters Patent is hereby corrected as shown below:

At column 7, line 2, change "range" to --ramp--.

Signed and Sealed this

Fourteenth Day of December, 1993

Attest:

BRUCE LEHMAN

Attesting Officer    Commissioner of Patents and Trademarks